(No Model.)

T. L. AVELING.
WHEEL FOR ROAD ENGINES.

No. 342,314. Patented May 25, 1886.

Witnesses
Baltus D. Long
Allan McLane Abert

Inventor
T. L. Aveling

UNITED STATES PATENT OFFICE.

THOMAS LAKE AVELING, OF BOLEY HILL HOUSE, ROCHESTER, ENGLAND.

WHEEL FOR ROAD-ENGINES.

SPECIFICATION forming part of Letters Patent No. 342,314, dated May 25, 1886.

Application filed April 13, 1886. Serial No. 198,679. (No model.)

*To all whom it may concern:*

Be it known that I, THOMAS LAKE AVELING, a subject of the Queen of Great Britain, residing at Boley Hill House, Rochester, England, engineer, have invented certain new and useful Improvements in Wheels Applicable Especially as the Driving-Wheels of Road Locomotive Engines, of which the following is a specification.

In the specification of a patent granted to me in Great Britain, No. 7,742, dated 25th June, 1885, I described a wheel formed with an inner ring or tire suspended within an outer ring or tire by coiled springs which were always in compression.

According to my present invention I apply the coiled springs in such a manner that they act both in compression and extension, so that when the wheel is used as a driving-wheel they all act together in driving, in place of one-half of them only. In this way the strain is equalized around the whole tire, and is not limited to a portion of it, as heretofore. To effect this, I rigidly secure each end of each spring to the stem of a short eyebolt in such a manner that the eye of the bolt projects but a short distance only from the end of the spring, and the eyebolt at one end I couple by a pin passing through its eye to the outer end of the spokes of the inner wheel, while the eyebolt at the other end I couple by a pin passing through its eye to the outer tire.

Preferably, in order to secure each spring end to the stem of an eyebolt, I screw a short worm into the end of the screw-like coil which forms the spring. The worm has a hole bored lengthwise through it for the stem of the eyebolt to screw into. Against the end of the spring I place a block or plate with a screw-thread or path on its face for the end of the coiled spring to bed against, and then screw in the stem of the eyebolt until a collar upon it comes against the outer end of the block or plate and causes the end coil or coils of the coiled spring to be nipped between the thread of the worm and the block or plate.

Other means than those above described for securing the spring ends to the eyebolts may be adopted.

In order that my said invention may be most fully understood and readily carried into effect, I will proceed to describe the drawings hereunto annexed.

Figure 1:
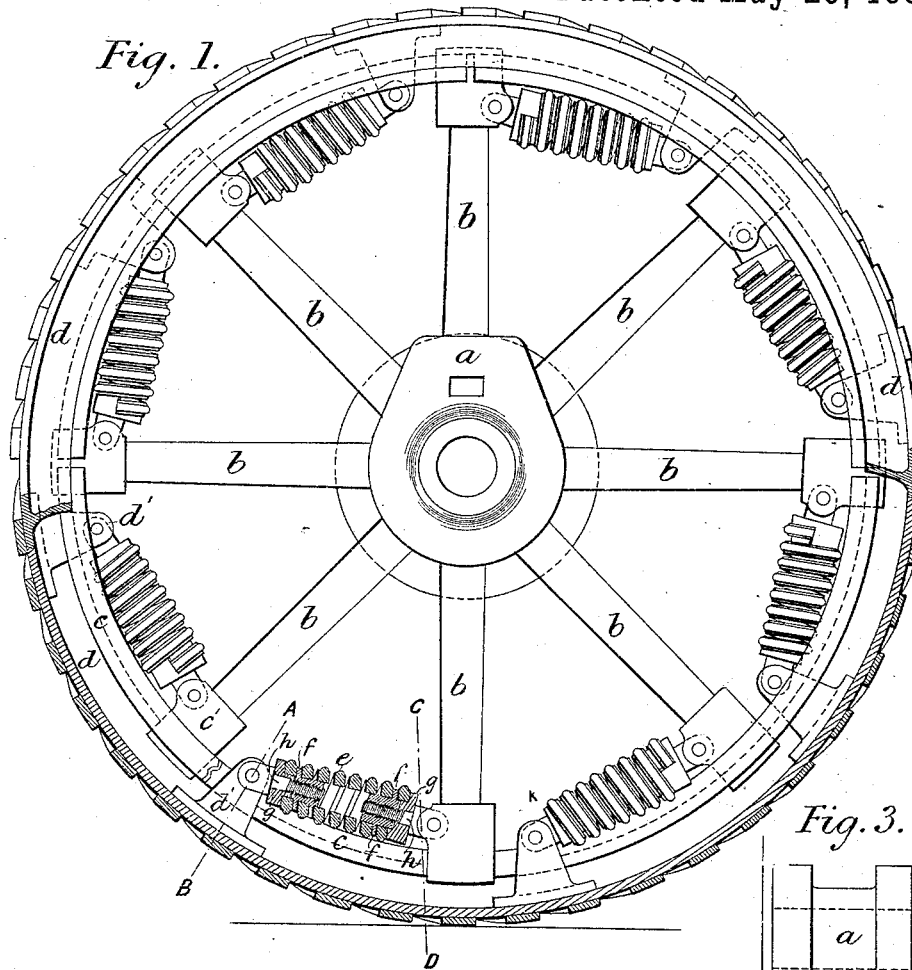
Figure 2:
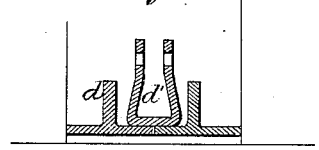
Figure 3:
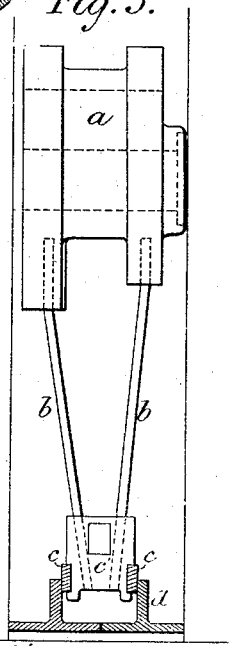

In the drawings, Figure 1 is a side elevation, partly in section, of a spring-wheel constructed in accordance with my invention. The wheel here shown is suitable for a road-locomotive. Fig. 2 is a section on the line A B in Fig. 1, and Fig. 3 is a section on the line C D in Fig. 1.

$a$ is the boss of the wheel; $b\ b$ are the spokes, rigidly connected thereto at their inner ends; and $c\ c$ indicate the inner ring or tire, fixed firmly to the outer ends of the spokes by the aid of the cast blocks $c'\ c'$.

$d$ is the outer ring or tire.

$d'\ d'$ are brackets fixed upon the tire $d$.

$e\ e$ are coiled springs. They are held in the following manner: $f\ f$ are worms screwed into them; $g\ g$ are end plates or blocks, each with a screw-path on its face to bed fairly against the end of the coiled spring; $h\ h$ are eyebolts with screwed stems passing through the end plates or blocks $g\ g$, and entering threaded holes in the center of the worm-pieces $f$. The eyebolts are screwed in until the head of the bolt abuts on the end plate, and the outer convolution of the spring is nipped between the end plate and the worm. The eye of the bolt $h$ at one end of each coiled spring is connected with the inner tire by being received into a recess in one of the blocks, $c'$, and is secured by a joint-pin, $i$. The eye at the other end of the coiled spring is connected with the outer tire by entering between the parts of one of the brackets $d'$, and is secured by a joint-pin, $k$. It will be observed that when this spring-wheel is at work the weight upon the wheel is sustained by the springs on one side of the wheel acting in tension and by the springs on the other side acting in compression; also, that when the wheel is operating as a driving-wheel the springs will be either in compression or tension, according to the direction of the movement.

Having now particularly described and ascertained the nature of my said invention, and in what manner the same is to be performed, I declare that what I claim is—

1. A spring-wheel having the spokes rigidly connected at their inner ends to the boss and at their outer ends to an inner ring or tire suspended within an outer ring or tire by coiled springs arranged around the wheel and having connection at their opposite ends, respectively, with the inner and the outer tires, said springs acting both in compression and extension, substantially as and for the purpose set forth.

2. The combination of parts for connecting the coiled springs with the inner and outer parts of the wheel, consisting of the worms $f$, end plates or blocks $g$, and eyebolts $h$, substantially as described.

THOMAS LAKE AVELING.

Witnesses:
HARRY PITTS,
CHARLES PRICE.